United States Patent

[11] 3,572,763

| [72] | Inventors | Craig W. Cannon<br>New Berlin;<br>Larry F. Stikeleather, Greendale, Wis. |
|---|---|---|
| [21] | Appl. No. | 778,046 |
| [22] | Filed | Nov. 22, 1968 |
| [45] | Patented | Mar. 30, 1971 |
| [73] | Assignee | Allis-chalmers Manufacturing Company<br>Milwaukee, Wis. |

[54] THREE-POINT HITCH
9 Claims, 7 Drawing Figs.

[52] U.S. Cl. .................................................. 280/479,
280/461, 172/272
[51] Int. Cl. ...................................................... B60d 1/00
[50] Field of Search ............................................ 280/479,
461, 461(.1), 460(.1); 172/272, 439

[56] References Cited
UNITED STATES PATENTS

| 2,869,654 | 1/1959 | Hershman | 172/439X |
| 3,031,208 | 4/1962 | Abbott | 172/439X |
| 3,255,828 | 6/1966 | Abbott | 172/439X |
| 3,421,779 | 1/1969 | Shelby | 280/479 |
| 3,432,184 | 3/1969 | Tweedy | 280/479 |

FOREIGN PATENTS

| 1,347,361 | 11/1963 | France | 172/439 |
| 1,045,553 | 8/1966 | Great Britain | 280/479 |

*Primary Examiner*—Leo Friaglia
*Attorneys*—Arthur L. Nelson, Kenneth C. McKivett and Robert B. Benson ABSTRACT: A three-point hitch having a powered upper link and draft arms to extend and contract the link and raise and lower the draft arms for easier connection of the tractor to the implement and better control of the implement during its operation.

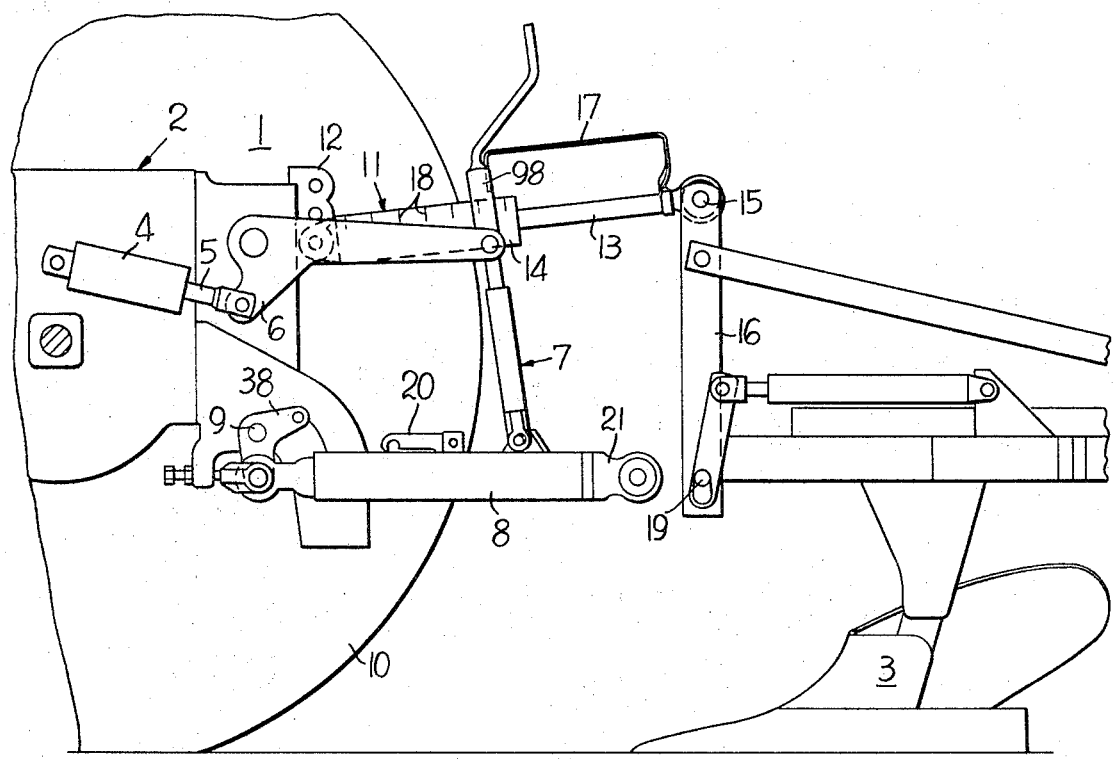

THREE-POINT HITCH

This invention relates to a vehicle and more particularly to a three-point hitch having power means to linearly extend and retract the upper link and raise and lower the draft arms to facilitate hitching and readily adjust the implement level and height during operation.

The conventional tractor and implement are provided with a means for hitching the two vehicles together. The three-point hitch provides a means of controlling the level and height of the implement during operation and accordingly is used in conjunction with mounted and semimounted type of implements. This requires the connection of the tractor hitch to three points on the implements to provide a control on the tractor for leveling and depth control on the implement as well as weight distribution on the rear wheels of the tractor. The conventional three-point hitch has a turnbuckle on the upper link which provides a means of lengthening or shortening the link. The lower draft arms are usually connected by backing the tractor to a point near the vehicle and then the operator dismounts from the tractor to connect the three points of the tractor hitch to the implement.

The draft arms of the three-point hitch may be provided with a hydraulic actuator operating a bellcrank to lift and lower the draft arms with a suitable control means to control this operation. The draft arms also may be provided with a mechanical-type latch which can be released to thereby extend the draft arms to facilitate connection to crossbars on the implement. For connection of the upper link, the turnbuckle is adjusted to provide the proper extension of the upper link to a crosspin in the upper end of the mast of the vehicle. The vehicle must then be backed into place to relatch the extension in the draft arms while the turnbuckle in the upper link must be adjusted to provide the proper operating position by leveling the implement. This connection although workable can be at times a little time consuming.

Accordingly, this invention provides an upper link having a powerized link to extend or contract the length of the upper link to facilitate connection to the crosspin in the upper end of the mast of the implement. Similarly, the lower draft arms are provided with an extension and a latch to permit manually to extend the draft arms which can be shortened and which automatically latch the draft arms in the shortened position. This provides the option of connecting the upper link to the crosspin on the implement and drawing the implement closer to the tractor to facilitate connection of the lower draft arms. An alternate method is to back a tractor to the proximity of the front end of the implement and then unlatch the extension on the draft arms to permit extension of the draft arms for inserting the crossbars in the pivotal connection on the rear end of the draft arm. The upper link is then connected by inserting a crosspin in the rear end of the upper link. To facilitate connecting the upper link, an actuator is used with the control means which can be mounted to the rear end of the tractor or on the actuator itself to readily extend or contract the upper link to provide the desired length for quickly aligning the upper link with the crosspin in the implement mast and thereby attach the implement.

A further refinement of this invention is the provision of an indicator on the hydraulic actuator with a pointer indicating the operating range, the travel range for an implement, and also indicating the limits of the range of movement.

Accordingly, it is an object of this invention to provide a three-point hitch having a powered upper link to extend and contract the link to facilitate connecting of an implement or controlling the operation of the vehicle.

It is another object of this invention to provide a three-point hitch having a powered upper link and powered draft arms to facilitate connection of the implement and to control the operation of the implement.

It is a further object of this invention to provide a three-point hitch having manually controlled power means for linearly extending and contracting the upper link while raising and lowering the draft arms.

It is a further object of this invention to provide a three-point hitch on a tractor with a hydraulically, electrically or mechanically operated upper link for linearly extending and contracting the upper link and hydraulically, electrically or manually operated draft arms for raising and lowering the hitch assembly.

Objects of this invention are accomplished by providing a three-point hitch having draft arms with extension means with mechanical latches for locking the extension means in the shortened position and manual means for releasing the latch to facilitate connecting of the implement to the tractor. The upper link is provided with powerized means to extend and contract the upper link to further assist in connecting the implement to the tractor and also to control the implement during its operation.

A further powerizing means is used to lift the draft arms to control the implement during its operation and also when the implement is raised to a travel position. The power means provide a horizontal and vertical movement of the three-point hitch and a means to engage the implement with ease and raise and lower the implement as desired. An indicating means is also provided to indicate to the operator when the hitch is positioned correctly to provide the leveling of the implement as required for proper operation.

The preferred embodiments of this invention will be described in the subsequent paragraphs and are illustrated in the attached drawings.

FIG. 3 is a side elevational view of the tractor and three-point hitch with the upper link being connected to the implement first;

FIG. 4 is a fragmentary side elevation view of the hitch on the tractor being connected to the implement by the draft arms first;

FIG. 7 is a fragmentary section showing mechanical means for operating the hitch mechanism.

Figure 1:
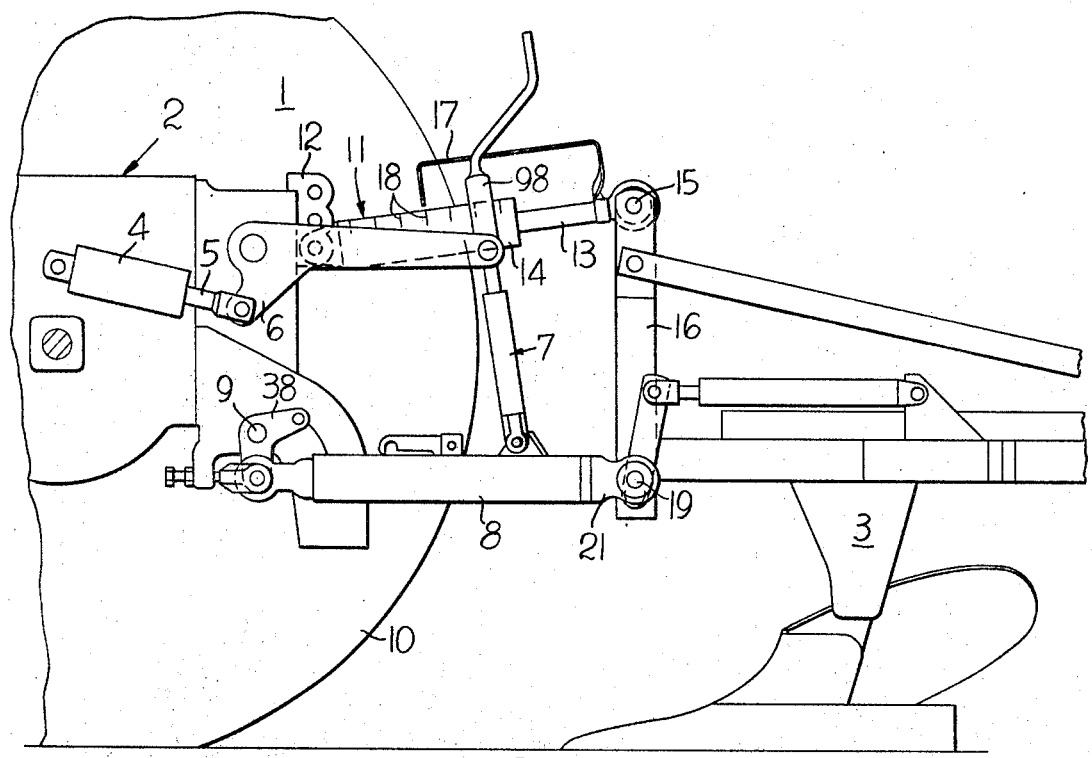
FIG. 1 illustrates an implement attached to the tractor in an operating position.
Figure 5:
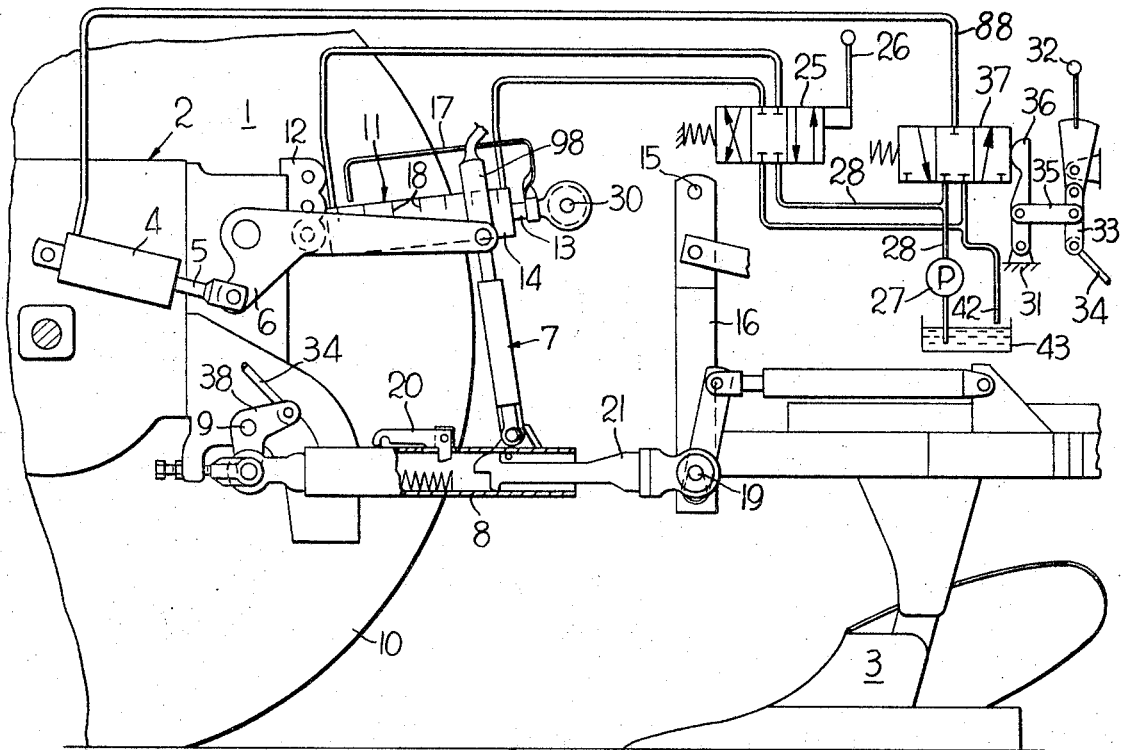
FIG. 5 is a side elevation view showing a hydraulic schematic diagram for operating the hitch mechanism.

Referring to the drawings, FIG. 1 shows a tractor 1 having the gear case 2 supporting the hitch linkage. The implement 3 is shown connected to the hitch linkage. The hitch linkage can be operated by various means and the source of energy may be electrical, mechanical or hydraulic as the case may be. For the purpose of illustration, the hydraulic system for operating the linkage will be described first. The hydraulic actuator 4 is pivotally mounted on the gear case 2 and has a rod 5 pivotally connected to the bellcrank 6 which is pivotally connected to the lift link 7. The lift link 7 includes a jackscrew 98 for adjusting the length of link 7. The link 7 is connected to the intermediate portion of the draft arm 8 which is pivotally connected to a torsion bar 9 mounted on the gear case 2. The torsion bar 9 operates a valve in the fluid system for automatic weight distribution of the rear wheels 10 on the tractor 1. This system is shown in FIG. 5 and will be subsequently described.

The upper link 11 is pivotally mounted on the bracket 12 supported on the gear case 2. The upper link 11 includes a hydraulic cylinder 14 having a rod 13 pivotally connected to the crosspin 15 in the mast 16 of the implement 3. The actuator 11 also has an indicator arm 17 supported by the rod 13 which extends to a scale 18 on the housing of the cylinder 14. The indicator provides a means showing the operator the actuator extension for implement travel position, the implement working position, etc.

The draft arms 8 are connected to the crossbars 19 in the lower end of the mast 16 which provide the other two points of hitch between the tractor and the implement 3.

Figure 2:
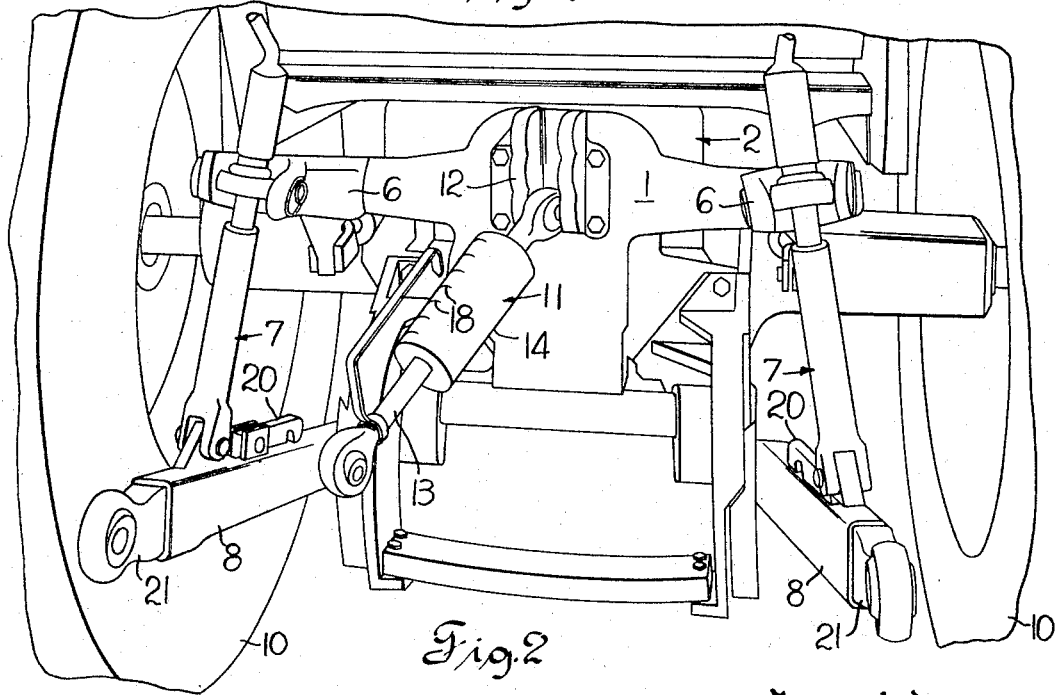
FIG. 2 illustrates a three-dimensional view of the three-point hitch and the rear portion of the tractor.

Referring to FIG. 2, the wheels 10 support the tractor 1. The bellcranks 6 are pivotally supported on the gear case 2 and pivotally connected to the links 7. The lift links 7 carry the draft arms 8. The bracket 12 supports the forward end of an upper link 11. The upper link 11 includes the cylinder 14 which is extendible or retractable in response to operation of the hydraulic system. The three dimensional view of FIG. 2 illustrates the relative position of the various components in the hitching linkage. The hydraulic system controls the movement of the upper link and the draft arms.

The upper link 11 may be extended or contracted in response to the control system. This in turn will facilitate connection of the rear end of the upper link 11 to the crosspin in the upper portion of the mast 16 in the implement 3. The draft arms 8 have a latch mechanism 20 which releases the extension arms 21 in each of the draft arms 8. The extension arms 21 may be drawn rearwardly to accommodate connection to the crossbars on the lower end of the mast 16. Once the crossbars are connected to the extension arms 21, the tractor may be reversed to relatch the latches 20 and complete the engagement of the hitch.

Referring to FIG. 3, the hitching linkage is shown wherein the upper link 11 is connected to the mast 16 first.

Referring to FIG. 5, the hydraulic system for operating the hitch mechanism is illustrated. To extend the upper link 11, the valve 25 is operated by the manual lever 26 which is moved forwardly to apply pressurized fluid from the pump 27 flowing in conduit 28 through the valve 25 to the cylinder 14. This will extend the upper link 11.

As the lever 26 is moved forwardly to extend the upper link 11, the link extends until the opening 30 in the end of the rod 13 is aligned with the crosspin 15 in the upper portion of the mast 16 which is then connected to the rod 13.

The manual lever 32 is pivotally connected on the chassis 31 and is connected by a link 33 to the pushrod 34. Another link 35 pivotally connects the actuating arm 36 to link 33 to operate the valve 37. It is noted that the valve 37 is operated automatically for the weight transfer system which is an integral part of the tractor. The pushrod 34 is operated by the crank arm 38 mounted on the torsion bar 9 on the gear case 2. The draft arms 8 rotate the torsion bar 9 in response to the draft load on the arms. The signal sensed is transmitted through the pushrod 34 and the lever 33, link 35 and actuating arm 36.

For the purpose of connecting the implement to the extension arms 8, the latch 20 may be unlatched to permit extending of the extension arm 21. The extension arm may be extended to be connected to the crossbar 19 on the implement on the lower portion of the implement mast 16. In event that the draft arms 8 are in alignment vertically with the crossbars 19, the lever 32 may be actuated to provide this alignment which operates the valve 37 to allow pressurized fluid from the pump 27 to flow through a conduit 88, to extend the actuator 4 which in turn rotates the bellcrank 6 connected to the lift arm 7 for raising of the draft arm 8. The lever 32 controls the flow of pressurized fluid to the actuator 4 for raising of the draft arms or releases the pressurized fluid in the actuator 4 and the weight of the hitch will cause the flow of fluid from the actuator 4 through the conduit 42 to return to the reservoir 43. Accordingly, it can be seen that the upper link 11 is powered to extend or retract in response to the operation of valve 25 which will position the proper alignment of the opening 30 in the rod 13 for engagement with the crosspin 15 in the top of the mast 16. The draft arms also have means for raising, lowering, extending, or retracting to accommodate connection with the crossbars 19 in the lower end of the mast 16.

Figure 6:
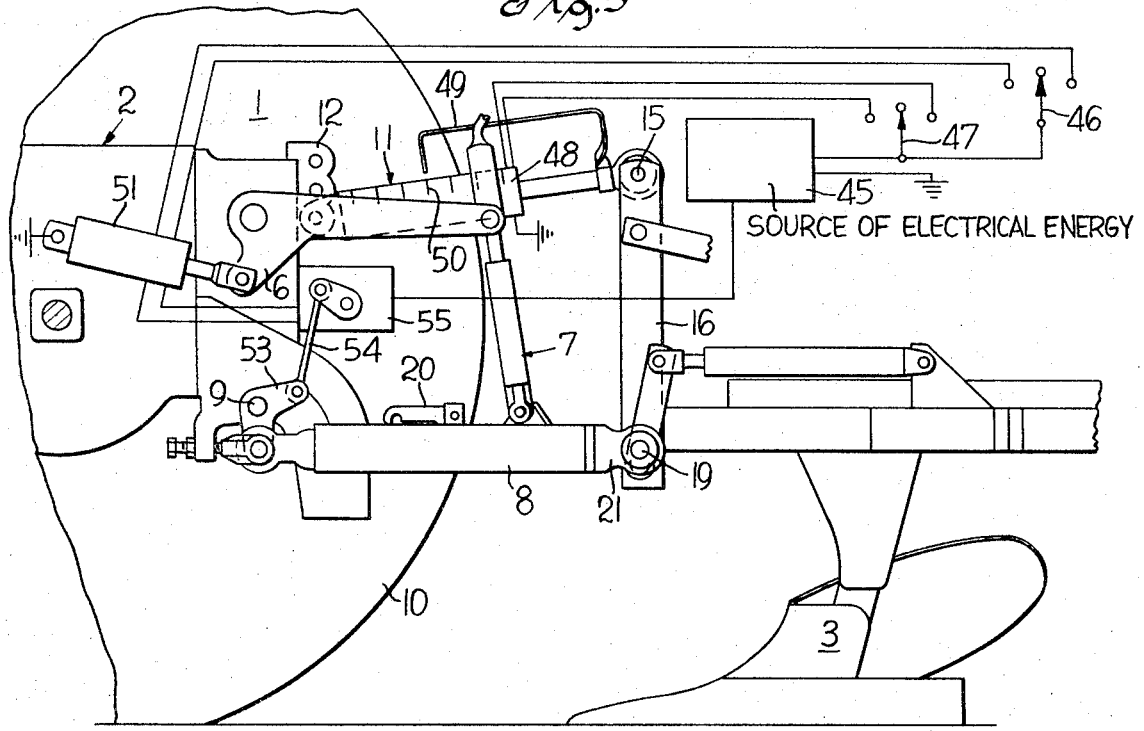
FIG. 6 is a side elevation view of the tractor and implement showing an electrical circuit to operate the hitch mechanism.

FIG. 6 illustrates a similar linkage for the draft hitch, however, the motors for extending the upper link 11 and raising the draft arms 8 are electrical. The electric motors are operated from a source of electrical energy 45. The switch 46 operates the lift and lowering of the draft arms 8 while the switch 47 controls the linear extension of upper link 11. The upper link 11 is pivotally connected on the gear case 2 and in connecting an implement it may be raised or lowered, as desired by the operator. The draft arms 8 are also provided with an extension arm 21 and a latch 20 which releases the extension arm to move rearwardly. When the implement is connected to the tractor through the hitch as described, the motor 48 in the upper link 11 is operated to contract the linear link of arm 11. This in turn will draw the implement closer to the tractor and causing a relatching of the latches 20 of the draft arms 8 at which time the connection of the implement is completed. The motor 48 will then be operated to set the indicator 49 at the proper position on the scale 50 for the operating range of the implement. The motor 51 will be then positioned in the operating range and the mechanism will operate automatically in response to electrical energy from the source 45. A torsion bar 9 is embraced by the crank 53 which operates the pushrod 54 to provide the proper signal to the control box 55 which in turn is connected to the motor 51.

FIG. 7 illustrates a further modification wherein the mechanical mechanism may be used to drive the upper link 11 in and out of the gear case 2. The sleeve is externally threaded and when rotated it moves in and out. The swivel connector 101 freely rotates in sleeve 100. The effect of this driving means is to extend the upper link 11 to facilitate adjustment or connection of the implement. The draft arms 8 may be also raised or lowered by the use of a worm gear 60 driving a gear segment 61 which is integral and pivots the bellcrank 6 to raise and lower the draft arm 8.

Although, not shown, it is understood that the automatic weight distribution system may be operated mechanically as well as electrically or hydraulically. The essential feature disclosed here is that these links have vertical and horizontal movement to facilitate engagement of the implement with the hitch on the tractor.

The operation of this hitching linkage will be described in the following paragraph.

It is understood that the power supplied for operating the linkages may be any of a various number of sources of energy such as electrical energy, mechanical energy or hydraulic energy. For the purpose of illustration, the operation of the hydraulic system will be described. The hydraulic system will be described since tractors commonly use the hydraulic system as an actuating means to supply the power needed for various functions.

Referring to FIG. 3, the tractor 1 is back to a position close to the implement. The upper link 11 is then extended by means of a control lever 26 operating the valve 25 shown in FIG. 5. This in turn extends the hydraulic actuator 14 in the upper link 11. By extending the upper link 11, the crosspin 15 may be inserted in the end of the rod 13, and the upper link 11 is connected to the upper portion of the mast 16. If the implement 3 is large enough or of such a nature that its center of gravity is enough to the rear, the upper link can then be contracted through operation of valve 25. This in turn will bring the crossbars 19 on the lower portion of the mast 16 in a position so that the lower draft arms 8 can be connected to the implement. In this manner, the connecting of the implement to the hitch linkage is completed.

It is further understood that the implement can be connected in the manner shown in FIG. 4. The upper link 11 can be contracted and the tractor reversed while the lower links 8 are connected as shown in FIG. 4. In some instances, it may be inconvenient or impossible to connect the links as shown. In this event, the latch 20 may be released to permit extending of the extension arms 21 for connection to the crossbars 19 as shown in FIG. 5. The crossbars 19 being connected, the implement could be moved under power of the tractor. If the implement is in a position where it is unable to connect the upper link, it could be drawn forwardly to a more level area for connection of the upper link. The tractor could also be reversed to relatch latches 20. Alternately, the upper link 11 may be extended by the use of the valve 25 to the appropriate linear length to permit inserting the crosspin 15 in the rear end of the upper link 11 and the upper portion of the mast 16. In either case, the upper link length is readily controlled for connection. In this manner, the hitch can be connected to the implement.

It is further understood that the extendible link 11 being powerized is a convenience which can be used during operation of the vehicle. The indicator scale 18 and 50 and the indicator arm 17 will show the operating range and provide the operator a means for determining the length of the upper link 11 which is generally used during operation of the implement. The operating position can be varied for most ideal positioning of the implement depending on the soil conditions.

It is further understood that the operating position of the draft arms 8 can be varied as well, to provide the proper height of the implement.

The height of the implement is controlled by the actuator 4 operating the lift arms 7 controlling the height of the draft arms 8. The leveling or beaming is accomplished through the upper link 11 and its position as set by the operator.

We claim:

1. A vehicle three-point hitching means comprising, a powered upper link having power means for linearly extending and contracting said upper link, a pair of powered lower draft arms having power means for lifting and lowering said draft arms, extension members on said draft arms with latches and means adapted for connection to an implement, said latches locking said extension members in the retracted position, a source of power connected to said power means of said upper link and said draft arms, control means connected intermediate said source of power and said power means to thereby control the movement of said upper link and said draft arms.

2. A vehicle three-point hitching means as set forth in claim 1 wherein a power means on said upper link and said draft arms include hydraulic actuators and the source of power includes a source of pressurized fluid.

3. A vehicle three-point hitching means as set forth in claim 1 wherein the power means on said upper link and said draft arms include electrical motors and the source of power includes a source of electrical energy.

4. A vehicle three-point hitching means as set forth in claim 1 wherein the power means on said upper link and said draft arms includes a mechanical driving means for linearly extending and contracting said upper link and a mechanical means for lifting and lowering said draft arms.

5. A vehicle three-point hitching means as set forth in claim 1 wherein said control means includes manually operated and manually controls extension and contraction of said upper link and manually controls raising and lowering said draft arms.

6. A vehicle three-point hitching means as set forth in claim 1 wherein said powered upper link has an indicator to show the length of the upper link.

7. A vehicle three-point hitching means as set forth in claim 1 wherein said draft arms include said extension members with latching means which can be manually released to permit manual extension of the draft arms for connection to support an implement, said power means of said upper link when connected to an implement in response to said control means providing retraction of said upper link and latching said extension members.

8. A vehicle three-point hitching means as set forth in claim 1 wherein the power means are hydraulic actuators on said upper link and said draft arms to linearly extend and contract the upper link and raise and lower the draft arms respectively, said draft arms include said extendible members normally latched in a short position, said hitching means thereby provides means for extension or retraction, raising and lowering of said draft arms and linearly extending or contracting said upper link to facilitate connection of an implement.

9. A vehicle three-point hitching means as set forth in claim 1 wherein the power means in said upper link and said draft arms include hydraulic actuators manually controlled, a hydraulic system connected to said draft arm actuators providing automatic operation and weight distribution on the rear vehicle wheels in response to draft arm load, an indicator on said upper link actuator showing the operating range of the implement in response to upper link length to thereby provide a means for manually operating the upper link and restoring the upper link actuator to an operating position for automatic operation of the implement.